United States Patent [19]

Briggs et al.

[11] 4,046,697
[45] Sept. 6, 1977

[54] PLEATED PAPER FILTER

[76] Inventors: Southwick W. Briggs, 6420 Western Ave., Chevy Chase, Md. 20015; William A. Brazerol, 2115 31st Place, SE., Washington, D.C. 20020

[21] Appl. No.: 866,169

[22] Filed: Oct. 13, 1969

Related U.S. Application Data

[63] Continuation of Ser. No. 711,159, Feb. 27, 1968, abandoned, which is a continuation-in-part of Ser. No. 371,899, June 2, 1964, abandoned.

[51] Int. Cl.² .................................................. B01D 27/06
[52] U.S. Cl. .................................. 210/457; 210/484; 210/490; 210/493 R
[58] Field of Search .............. 210/493, 493 B, 484, 210/457, 493 R, 490; 55/521

[56] References Cited

U.S. PATENT DOCUMENTS

| 3,216,578 | 11/1965 | Wright et al. | 210/484 |
| 3,241,680 | 3/1966 | Humbert | 210/457 |
| 3,397,793 | 8/1968 | MacDonnell | 210/457 |

FOREIGN PATENT DOCUMENTS 588,991  6/1947  United Kingdom

*Primary Examiner*—Thomas G. Wyse
*Assistant Examiner*—Robert H. Spitzer
*Attorney, Agent, or Firm*—Sughrue, Rothwell, Mion, Zinn and Macpeak

[57] ABSTRACT

A permeable pleated paper filter medium having axial pleats is disposed around a perforated center tube, a loosely woven cylindrical textile netting is adhesively bonded to the outer folds of the filter medium, and a perforated cover member is disposed coaxially around said textile body.

8 Claims, 4 Drawing Figures

PLEATED PAPER FILTER

CROSS REFERENCE TO RELATED APPLICATION

This application is a continuation of application Ser. No. 711,159 filed Feb. 27, 1968 which in turn is a continuation-in-part of application Ser. No. 371,899 filed June 2, 1964, both now abandoned.

This invention relates to pleated paper filters and is concerned with the maintenance of the outer folds of pleated paper media employed in such filters in spaced relationship so as to utilize the full potentialities of the surface area available.

There is a tendency for the folds of pleated paper filters exposed to upstream pressures to collapse on one another and thereby render less than the complete area of the medium available to perform the filtering function. This results in the reduction of the life and effectiveness of such filters.

It has been proposed in the past to provide an adhesive bond between the outer folds of a pleated paper filter medium and a cover member to maintain the desired spaced relationship so as to have the maximum surface area available for filtering purposes. It is desirable to avoid the cost of adhesive and the cost of supplying it and it is also desirable to retain porosity of the entire medium rather than sacrifice it in the areas to which such adhesives have been applied.

It is among the objects of the present invention to solve this problem by providing a filter comprising a perforated center tube, a permeable paper filter medium having axial pleats defining inner and outer folds, the inner folds engaging the center tube, and a loosely woven textile body embracing the outer folds and maintaining them in spaced relationship. In accordance with a preferred embodiment, the loosely woven textile body can be adhesively bonded to certain of the outer folds, and where desired, the body can be protected by the use of a cover member embracing it. Where desired, the loosely woven textile body can be adhesively bonded to each of the outer folds of the filter medium, bearing in mind that the amount of adhesive applied to the filter medium will be far less in such cases than where the bond is adhesively produced between such folds and cover members of conventional types.

A more complete understanding of the invention will follow from a description of the accompanying drawings wherein.

Figure 1:
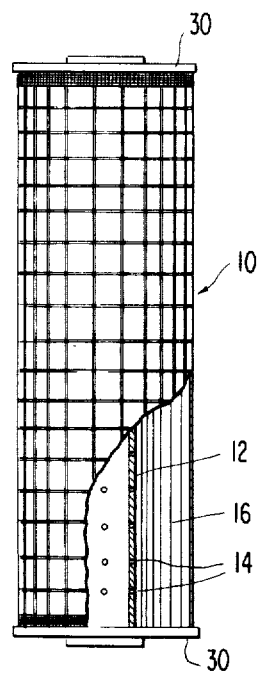
FIG. 1 is an elevation of a filter, partially broken away, depicting the invention.
Figure 2:
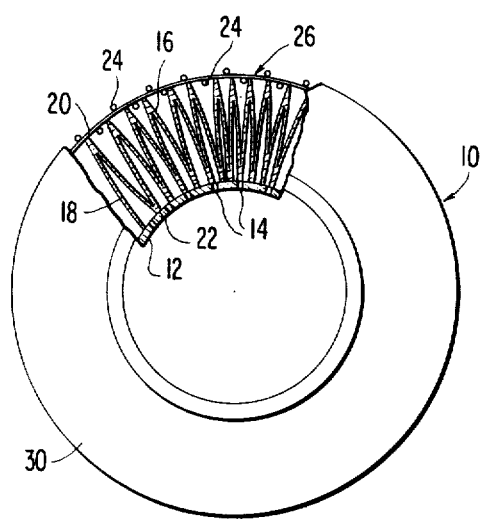
FIG. 2 is a plan view, partially broken away depicting a filter of the type shown in FIG. 1.

The filter 10 includes a center tube 12 containing perforations 14 surrounded by a pleated paper filter medium 16 whose pleats 18 define outer folds 20 and inner folds 22, the inner folds engaging the outer periphery of the center tube 12 and the outer folds maintained in a desired spaced relationship by having bonded thereto the threads 24 of a loosely woven textile body 26 which may be formed of any suitable material, natural or synthetic, or combinations thereof, including, for example, sisal, jute, cotton, etc. Such bodies may be impregnated with thermosetting resins if desired, such as phenolformaldehyde resins, so as to render them resistant to hydrocarbon materials at elevated temperatures. Such textile materials are less subject to embrittlement than impregnated paper wrappers of the types now in use. The pleats 18 are inherently resiliently flexible in a direction generally circumferential of the filter medium 16.

Moreover, by the use of loosely woven textile fibers of the types contemplated, the surface area of the outer pleats of the filter medium that will be covered by adhesive will be far less than would be the case where conventional outer cover members are adhesively bonded to such outer folds.

Figure 4:
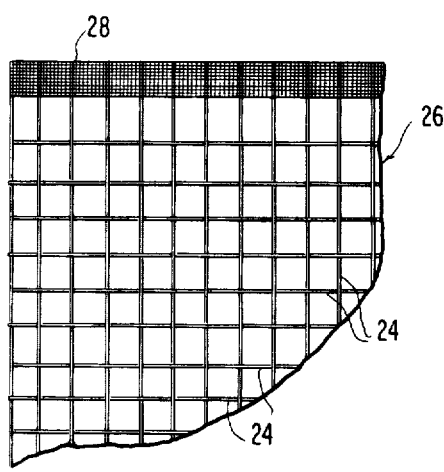
FIG. 4 is a fragmentary plan view depicting a loosely woven textile body of a type suitable for use in conjunction with the present invention.
Figure 3:
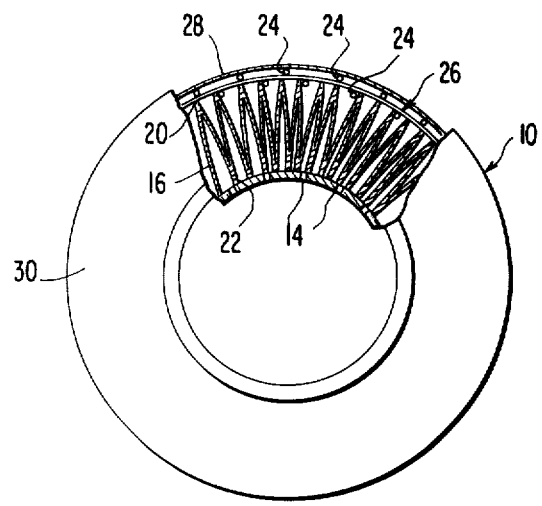
FIG. 3 is a view similar to that of FIG. 2 showing the addition of a cover member.

As depicted in FIG. 3, the loosely woven textile body can be surrounded by a cover member 28, such as a thermosetting resin impregnated paper cover member, to facilitate handling and protect the textile body against damage. As shown in FIG. 4, such textile bodies can be reinforced by the provision of selvage edges 28.

The filter of FIG. 1 has been provided with end caps 30 of conventional form.

A number of variations of the present invention will suggest themselves to those skilled in the art and it is intended to encompass all such variations as fall within the scope of the appended claims.

What is claimed is:

1. In a filter, an elongated permeable filter element providing a lengthwise extending annular array of normally stable pleats, each being resiliently flexible in a direction generally circumferential of the filter element, and flexibly collapsible foraminous means successively extending from pleat to pleat and being secured to each pleat and interconnecting the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent ganged pleats thereafter resiliently restoring to act collectively through said flexible means in returning the collapsed pleat.

2. In a filter, an elongated permeable filter element providing a lengthwise extending annular array of normally stable pleats, each being resiliently flexible in a direction generally circumferential of the filter element, and flexibly collapsible means successively extending from pleat to pleat and being secured to each pleat and interconnecting the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent ganged pleats thereafter resiliently restoring to act collectively through said flexible means in returning the collapsed pleat, said means including tension transmitting flexible netting circumferentially encircling said filter element in widely distributed, multiple point fixedly intersecting contact with outer extremities of the ganged pleats.

3. In a filter, an elongated permeable filter element providing a lengthwise extending annular array of normally stable circumferentially distributed pleats, each being resiliently flexible in a generally circumferential direction about said filter element, and tension transmitting flexibly collapsible foraminous means secured to each pleat and extending circumferentially of the filter element and interconnecting the circumferentially distributed individual pleats thereof in a selectively collapsible ganged relationship to enable circumferential collapse of any particular ganged pleat towards an adjacent ganged pleat and to provide concurrent circumferential flexing movement of a plurality of successively adjacent ganged pleats when said particular one thereof undergoes circumferential collapse to enable said successively adjacent ones, in subsequently restoring, to return the collapsed one.

4. In a filter, an elongated permeable filter element providing a lengthwise extending annular array of normally stable pleats, each being resiliently flexible in a direction generally circumferential of the filter element, tension transmitting flexibly collapsible netting circumferentially encircling said filter element in widely distributed, multiple point, intersecting contact with outer extremities of said pleats, and securing means fixing said netting to the outer extremities of the pleats to connect the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent pleats thereafter resiliently restoring to act collectively through said netting in returning the collapsed pleat.

5. In a filter, an elongated permeable paper filter element providing a lengthwise extending annular array of normally stable pleats, each being resiliently flexible in a direction generally circumferential of the filter element, flexibly collapsible netting of woven cotton fiber material circumferentially encircling said filter element in widely distributed, multiple point, intersection contact with outer extremities of said pleats, said netting spanning a major fraction of the length of said filter element, and adhesive securing means fixing said netting to the outer extremities of the pleats to establish the netting in tension transmitting relation between adjacent pleats and thereby connect the pleats in a selectively collapsible ganged relationship to enable circumferential collapse of any particular ganged pleat towards an adjacent ganged pleat and to provide concurrent circumferential flexing movement of a plurality of successively adjacent ganged pleats when said particular ganged pleat undergoes circumferential collapse, with each of said plurality of successively adjacent pleats thereafter resiliently restoring to act collectively through said netting in returning the collapsed pleat.

6. In a filter, an elongated permeable filter element providing a lengthwise extending annular array of normally stable pleats, each being resiliently flexible in a direction generally circumferential of the filter element, and flexibly collapsible foraminous means successively extending from pleat to pleat and being secured to each pleat and interconnecting the pleats in a ganged relationship.

7. Apparatus according to claim 6, wherein said foraminous means is a loosely woven textile netting.

8. Apparatus according to claim 7, wherein said netting is impregnated with a thermosetting resin.

* * * * *